(12) United States Patent
Penney et al.

(10) Patent No.: US 7,036,984 B2
(45) Date of Patent: May 2, 2006

(54) DIGITAL THERMOMETER FOR MEASURING BODY TEMPERATURE

(75) Inventors: Melinda Penney, Providence, RI (US); Dalita Tomellini, Rehoboth, MA (US); Sherin Beth Lussier, North Providence, RI (US)

(73) Assignee: Lindon Group, Inc., Providence, RI (US)

( * ) Notice: Subject to any disclaimer, the term of this patent is extended or adjusted under 35 U.S.C. 154(b) by 0 days.

(21) Appl. No.: 10/719,200

(22) Filed: Nov. 20, 2003

(65) Prior Publication Data
US 2004/0146087 A1 Jul. 29, 2004

Related U.S. Application Data

(60) Provisional application No. 60/428,817, filed on Nov. 25, 2002.

(51) Int. Cl.
*G01K 1/14* (2006.01)
*G01K 7/00* (2006.01)

(52) U.S. Cl. .................. 374/208; 374/170; 374/163

(58) Field of Classification Search ............. 374/158, 374/208, 163, 187, 188, 170; 600/474
See application file for complete search history.

(56) References Cited

U.S. PATENT DOCUMENTS

| | | | |
|---|---|---|---|
| 2,817,236 A | 12/1957 | Van Alstyne, Jr. | |
| 3,221,555 A * | 12/1965 | Biber | 374/183 |
| 3,695,110 A | 10/1972 | Biolik | |
| 3,946,613 A | 3/1976 | Silver | |
| 4,077,690 A * | 3/1978 | Koether | 439/320 |
| 4,317,367 A * | 3/1982 | Schonberger | 374/165 |
| 4,502,794 A | 3/1985 | Leverty | |
| 4,601,589 A * | 7/1986 | Meisner | 374/208 |
| 4,741,627 A | 5/1988 | Fukui et al. | |
| 4,813,790 A | 3/1989 | Frankel et al. | 374/208 |
| 5,013,161 A | 5/1991 | Zaragoza et al. | |
| 5,018,875 A | 5/1991 | Cook | |
| 5,044,770 A * | 9/1991 | Haghkar | 374/208 |
| 5,133,606 A * | 7/1992 | Zaragoza et al. | 374/208 |
| 5,165,798 A | 11/1992 | Watanabe | 374/208 |

(Continued)

FOREIGN PATENT DOCUMENTS

JP 1270631 A 11/1986

(Continued)

OTHER PUBLICATIONS

"integral" The American Heritage Dictionary of the English Language, Fourth Edition. 2000. Houghton Mifflin Company.

*Primary Examiner*—Gail Verbitsky
(74) *Attorney, Agent, or Firm*—Fish & Richardson P.C.

(57) ABSTRACT

A digital thermometer with enhanced conformity to the anatomy, such as in and around the mouth of a human being. A non-linear probe has a temperature sensor at a first end adapted to be inserted into the mouth and under the tongue. An intermediate portion of the probe is shaped to rest on the lower lip and/or teeth. The probe may also be flexible such that it may be bent into the desired non-linear configuration prior to use, in which case the intermediate portion of the probe may be linear prior to use. A display component displays the measured temperature. Electronic circuitry receives a temperature signal from the temperature sensor, translates the signal into a value representative of the measured temperature, and provides the translated value to the display for displaying the temperature.

23 Claims, 7 Drawing Sheets

U.S. PATENT DOCUMENTS

| | | | |
|---|---|---|---|
| 5,176,704 A | | 1/1993 | Berndt |
| 5,178,468 A | * | 1/1993 | Shiokawa et al. .......... 374/185 |
| 5,312,187 A | | 5/1994 | Chiu |
| 5,445,026 A | * | 8/1995 | Eagan ......................... 73/591 |
| 5,458,121 A | * | 10/1995 | Harada ....................... 600/474 |
| 5,534,013 A | | 7/1996 | Zeindler |
| 5,575,563 A | | 11/1996 | Chiu et al. |
| 5,725,308 A | * | 3/1998 | Smith et al. ................ 374/169 |
| 5,991,652 A | | 11/1999 | Barthelemy et al. |
| 6,000,845 A | * | 12/1999 | Tymkewicz et al. ........ 374/155 |
| 6,090,050 A | | 7/2000 | Constantinides |
| 6,105,620 A | * | 8/2000 | Haberl ....................... 138/118 |
| 6,129,673 A | | 10/2000 | Fraden |
| 6,206,518 B1 | * | 3/2001 | Peng et al. .................. 351/47 |
| 6,385,492 B1 | * | 5/2002 | Ollivier et al. ............. 607/122 |
| 6,491,630 B1 | * | 12/2002 | Saccardo et al. ........... 600/437 |
| 6,634,789 B1 | * | 10/2003 | Babkes ....................... 374/208 |
| D490,327 S | * | 5/2004 | Lussier et al. ............... D10/57 |
| 6,854,880 B1 | * | 2/2005 | Hsieh ......................... 374/163 |
| 6,957,911 B1 | * | 10/2005 | Wong et al. ................ 374/208 |
| 2003/0128738 A1 | * | 7/2003 | Chen ......................... 374/185 |
| 2003/0212339 A1 | * | 11/2003 | Lussier et al. .............. 600/549 |
| 2003/0212340 A1 | * | 11/2003 | Lussier et al. .............. 600/549 |
| 2004/0071188 A1 | * | 4/2004 | Knieriem et al. ........... 374/163 |
| 2004/0170216 A1 | * | 9/2004 | Russak et al. .............. 374/208 |
| 2005/0047478 A1 | * | 3/2005 | Yu ............................. 374/163 |

FOREIGN PATENT DOCUMENTS

JP        2004045147 A  *  2/2004

* cited by examiner

70 deg. < ∅3 < 180 deg.

DIGITAL THERMOMETER FOR MEASURING BODY TEMPERATURE

CROSS REFERENCE TO RELATED APPLICATIONS

This application claims priority from U.S. Provisional Application No. 60/428,817, filed Nov. 25, 2002.

BACKGROUND OF THE INVENTION

This invention relates generally to apparatus for electronically measuring the temperature of a living body, and more particularly, to a thermometer that exhibits enhanced conformity to the anatomy of a human being, especially in and around the mouth.

The basic mercury thermometer has been the standard for measuring body temperature for decades and is known virtually throughout the world. It consists of a hollow glass rod with a bulb of mercury at one end and a temperature scale along the glass rod. Typically, it is inserted into the mouth of a human being. Errors can of course be made in reading the temperature from the scale. Care and a certain amount of expertise are required for proper and accurate use.

From the patient's viewpoint, this form of thermometer is awkward because the thermometer must be held under the tongue. As viewed from the side, the rod of the thermometer should be inclined upwardly at an angle of about 30 degrees from the horizontal in order to operate effectively and accurately. Many patients have a natural tendency to bite down on the thermometer with their teeth. The upper teeth of most humans extend forward of the lower teeth with an overbite. When the thermometer is inserted in the mouth, it ordinarily rests on or close to the lower teeth. Thus, when a patient bites down on the thermometer, the lower teeth act as a fulcrum to apply rotational forces on the thermometer. Such rotational forces tend to dislodge the thermometer from under the tongue, usually up to and against the palate. This requires that the thermometer be relocated back under the tongue. To avoid this problem, some patients extend their lower jaw so that the lower teeth are forward of the upper teeth. However, this extension of the lower jaw is unnatural and uncomfortable.

Electronic thermometers have been introduced which emulate the linear structure of the basic mercury thermometer. A numerical display is usually disposed on electronic thermometers to assist in reading the measured temperature. Electronic thermometers also avoid any potential mercury exposure issues associated with a mercury thermometer. These electronic thermometers have a temperature sensing tip at one end for insertion under the tongue, an intermediate linear shaft and an enlarged body or housing at the end opposite from the sensing tip. The enlarged housing contains electronics for translating a temperature signal from the sensing tip into the currently measured temperature. Typically, the enlarged housing also contains a display, such as of the liquid crystal display (LCD) type, for displaying the measured temperature. The enlarged housing also contains a source of electrical power, such as a miniature battery.

Such electronic thermometers with digital displays offer improved convenience and accuracy compared to reading the linear scale of the basic mercury thermometer. However, these linear electronic thermometers exacerbate the problems of keeping the tip of the thermometer under the tongue due to the increased moments of inertia presented by the additional weight and mass of the enlarged housing at the opposite end of the thermometer. This problem can be particularly acute in. patients unused to, or uncooperative in, having their temperature taken, such as children or the elderly.

Hospitals and other institutions use thermometers of different designs. Typically, a hospital thermometer has a linear probe that is placed under a patient's tongue in order to read the patient's temperature. The probe is usually detached from the housing portion of the thermometer where the electronics are housed and where the read-out of the patient's temperature is displayed. This detached probe design helps to keep the thermometer clean and sanitized by avoiding contact with the sick patient. The detached probe also allows a caregiver to read the temperature of a patient on a LCD screen that is in close proximity to the caregiver and not in close proximity to the sick patient's mouth. These types of thermometers necessitate that the patient keep the linear probe under the tongue in the correct position for the appropriate period of time, often for 30 seconds or more. The linear probe of a hospital thermometer presents the same limitations as discussed above in that it is uncomfortable and is difficult to keep positioned in the mouth and under the tongue in the correct position for temperature taking. People who are ill, and the elderly have even a more difficult time keeping the probe positioned properly. The thermometer must be held in position for the requisite time period to produce an accurate reading. When the patient shifts the probe away from the hot spot under the tongue, the reading time is increased and the accuracy of the reading is compromised. In hospital settings it is often necessary to obtain precise temperature readings in order to properly diagnose and monitor a patient. Therefore, the existing hospital thermometers present the problems of being uncomfortable, slow and inaccurate.

SUMMARY OF THE INVENTION

The present invention provides oral thermometers and methods for measuring the temperature of a living being, e.g., a human. The thermometers include a temperature-sensing tip that is disposed to be positioned under the tongue of a patient and in contact with the floor of the mouth, with the temperature-sensing tip properly positioned for enhanced accuracy and comfort. The temperature-sensing tip extends from a probe that is curved or non-linear in shape to conform to the natural anatomy of the patient's mouth. The probe is not integral with the housing portion of the device, but rather is attached to such housing by means of a wire, cord or other means. Thus, the probe is detached from the housing portion of the thermometer where the electronics are housed and where the read-out of the patient's temperature is displayed, making the thermometer suitable for hospital and clinical use.

Preferred thermometers feature a probe design that prevents the temperature-sensing tip from accidentally sliding off the hot spot found under the tongue of a patient. The preferred thermometers exhibit enhanced conformity to the anatomy of the patient, particularly in and around the mouth.

The probe may be flexible so that it can be bent into a desired non-linear configuration to best fit the mouth of the patient. Such flexible probes may have an internal stiffener, so that the probe will hold the shape to which it is bent. The internal stiffener may be, for example, a strand of copper wire, a polymer of good ductility and low elasticity, or a series of flexible joints. The internal stiffener may be covered by a softer plastic overmold. Alternatively, these probes can be made of a polymer which is flexible and of low elasticity so as to be poseable into a desired shape and remain shaped without requiring a separate internal stiffener.

Some preferred thermometers are configured so that biting down on the thermometer probe will not cause the sensing tip to become dislodged from under the tongue.

In some implementations, the thermometer includes a means to protect the probe of the thermometer when not in use.

In some preferred embodiments, the thermometer includes a housing that displays a patient's temperature on a LCD screen that is easy to read and to see, and that is in close proximity to the caregiver and not in close proximity to the sick patient's mouth.

These and other objects, features and advantages of the present invention will be better understood in connection with the following drawings and description of the preferred embodiments.

DETAILED DESCRIPTION OF THE INVENTION

Figure 1:
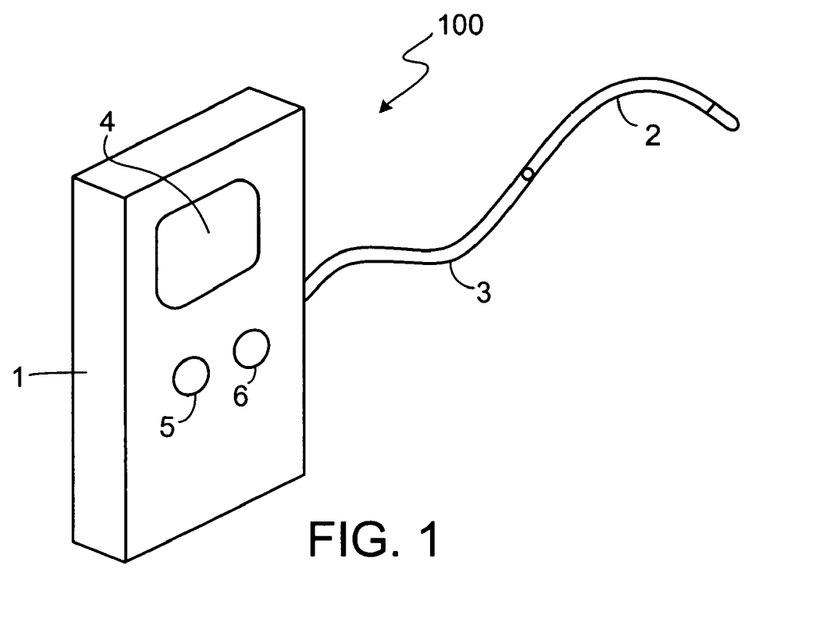
FIG. 1 is perspective view of an oral thermometer incorporating features of the present invention.

The various drawing figures will now be referred to in detail. Turning first to FIG. 1, an oral thermometer, which is especially suitable for measuring the body temperature of human being by taking a temperature measurement in the mouth, is generally designated 100. The illustrated digital thermometer includes a housing 1, a probe 2, an electrical cord 3, and a display 4 in the housing. Multiple switches 5 and 6 are manually operable to electrically activate or deactivate the thermometer. For example, switches 5 and 6 may be of the push-button type.

Figure 2:
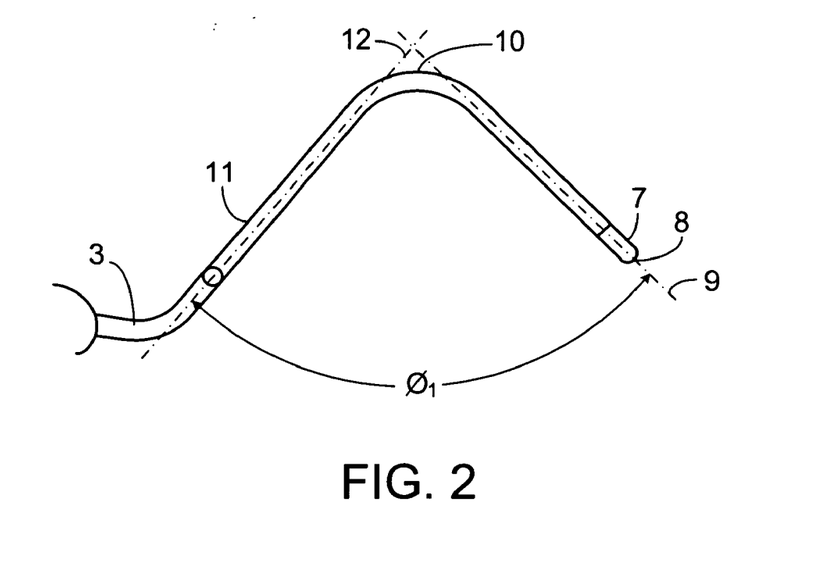
FIG. 2 is a side view of one envisionment of the unique oral thermometer probe shown in FIG. 1.

As can be seen in FIG. 2, the probe 2 has a first end 8 that is the end point of the temperature sensing tip 7 and a second end 11 that is attached to the wires 3 that go to the housing 1. Temperature sensing end 7 is preferably fitted with a metal tip for better heat conduction to an internal temperature sensor, such as a thermistor. An intermediate portion 10 of probe 2 extends between the first and second ends 8 and 11. Intermediate portion 10 is non-linear. For example, intermediate portion 10 may be curved, and may form an arc. As will be discussed below with respect to FIGS. 2, 3, and 9, intermediate portion 10 is shaped to generally conform to the shape of the inner portion of the mouth located under the tongue and to the lower lip and/or the lower teeth of mouth and is shaped to easily and comfortably protrude from the patients mouth at the non-sensing tip end 11 of the probe 2. Of course, the dimensions of probe 2 may be scaled as appropriate to fit a smaller mouth, such as that of a child.

Suitable arrangements are provided to display the temperature measured by the thermometer. In the illustrated embodiment, a front side display 4 is provided. Temperature registration can be presented at other locations, such as at a side, edge, top or bottom location. Display 4 may be of the liquid crystal display (LCD) type.

Figure 3:
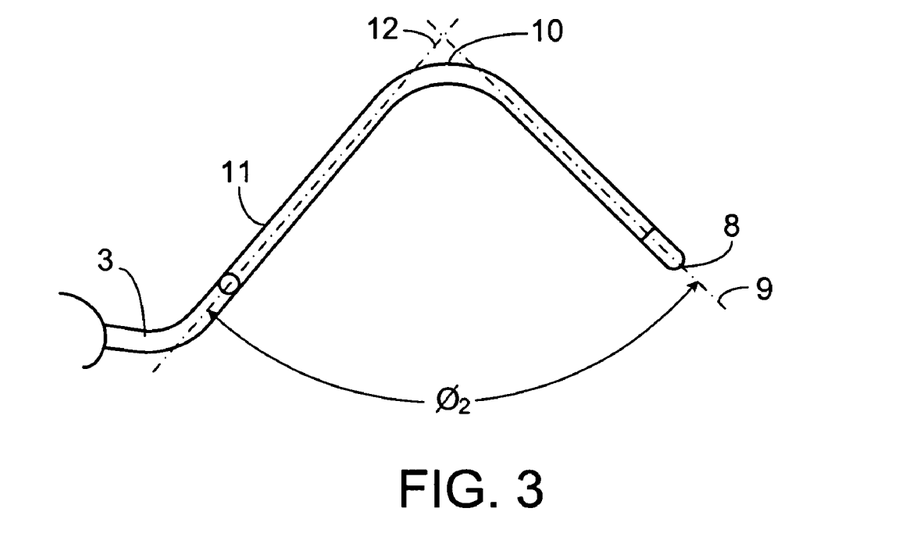
FIG. 3 is a side view of another envisionment of the unique non-linear oral thermometer probe as shown in FIG. 1.
Figure 9:
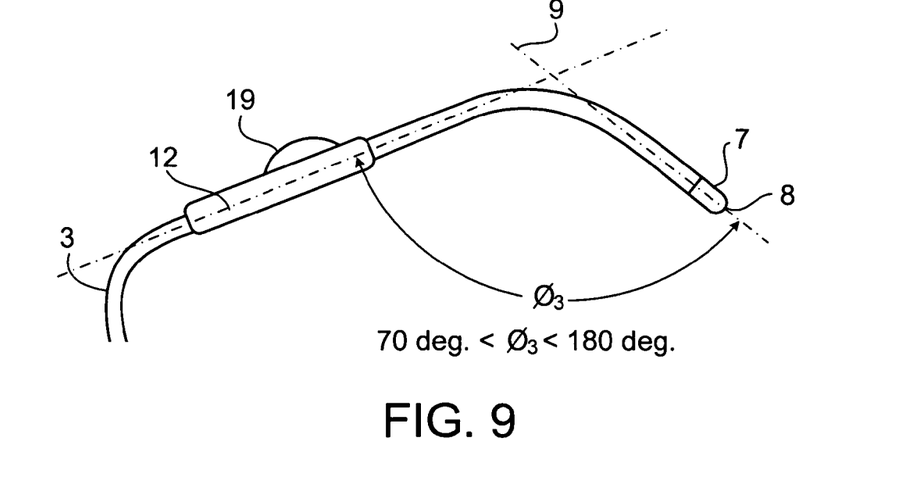
FIG. 9 is a side view of another embodiment of the unique oral thermometer with a nonlinear probe that is detached from the housing of the unit where the on-off button is located on the end of the probe instead of the housing.

With reference to FIGS. 2, 3 and 9, the illustrated probes are non-linear and may be curved so as to form either an acute angle $\Phi_1$ between lines 9 and 11 which extend from the two ends of the probe along the generally linear end regions of the probe, as shown in FIG. 2, or an obtuse angle $\Phi_2$, defined in the same manner, as shown in FIGS. 3 and 9. The angle formed between lines 9 and 11 may range, e.g., from 70 to 180 degrees. When the probe is curved in this manner, the temperature-sensing tip 7 is positioned downward to fit comfortably under the patient's tongue.

Electrical conductors provide an electronic circuit path from a temperature sensor, such as a thermistor, in the sensing tip 7 to electronic circuitry on a circuit board. The electronic circuitry translates the temperature signal from the temperature sensor into a digital value representative of the measured temperature and provides the digital value to display 4 for displaying the measured temperature.

Preferably, the probe 2 has an exterior portion formed over the interior portion, as by over-molding techniques such that exterior portion consists of a polymer that is softer than the interior portion. Examples of these polymers include polyvinyl chloride, silicone polymers, styrene-butadiene elastomers, artificial rubber and the like. Such materials provide a more comfortable feel to the patient's mouth and also provide enhanced friction to facilitate retention at a desired location.

Figure 4:
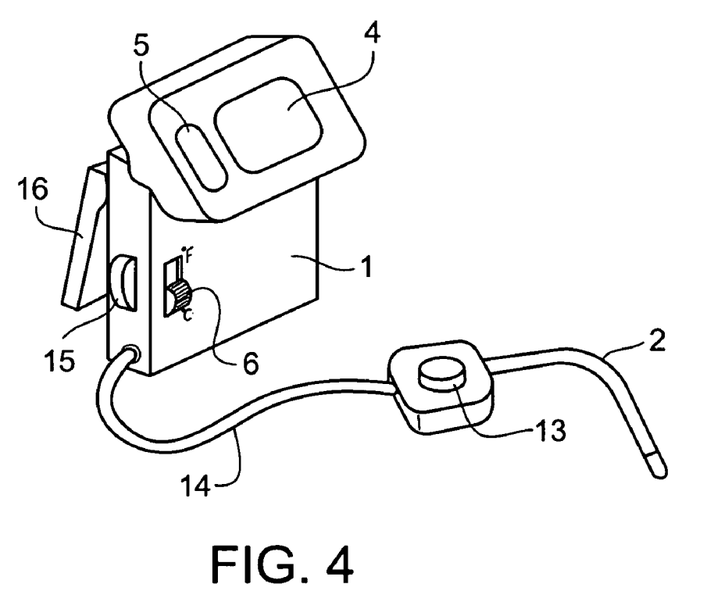
FIG. 4 is a view of the oral thermometer with the non-linear probe not directly attached to the housing of the thermometer, but connected to the housing by wire or other electronic means.
Figure 5A:
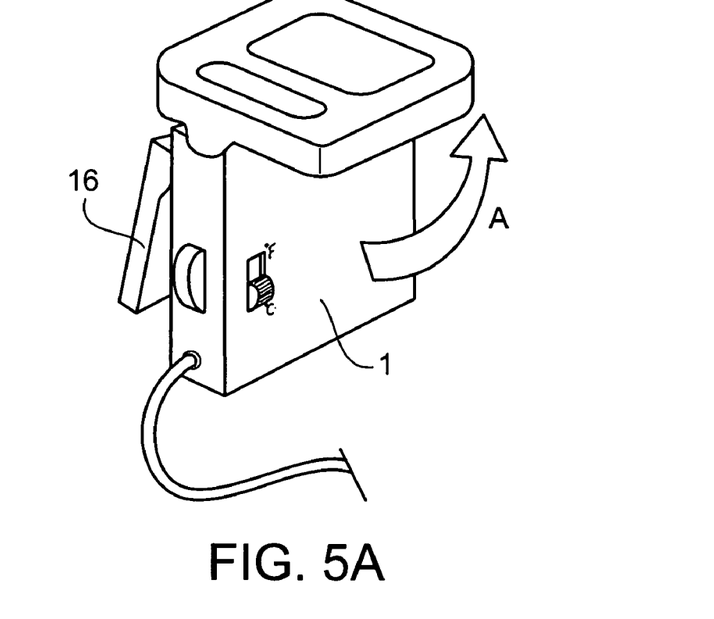
FIG. 5a is a side view of the oral thermometer in FIG. 4 with a view of the LCD screen in the flipped up position.
Figure 5B:
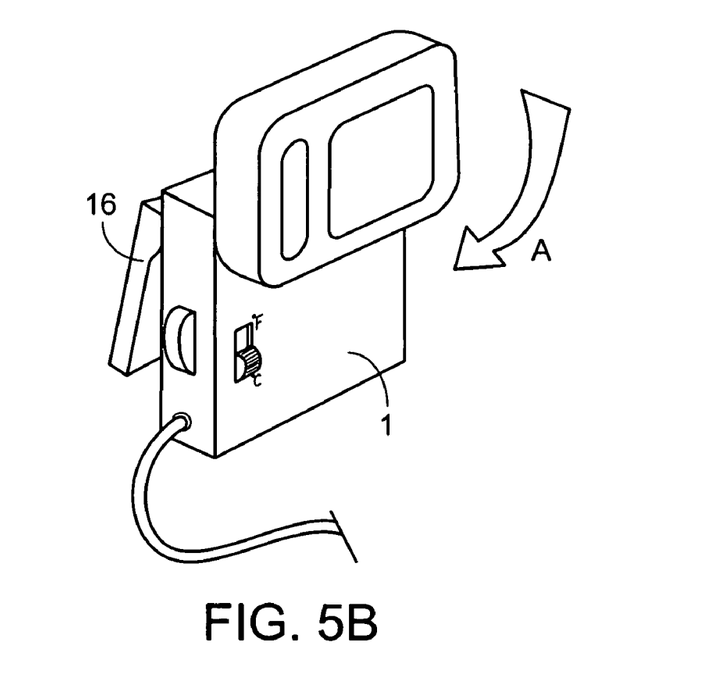
FIG. 5b is a side view of the oral thermometer in FIG. 4 with a view of the LCD screen in the flipped down position.

With reference to FIG. 4, a display screen 4 may be located on the housing in such a manner as to allow it to pivot, as indicated by arrows A in FIGS. 5A and 5B. The pivotable display may be flipped up (FIG. 5A), down (FIG. 5B) or to an intermediate position (FIG. 4).

With further reference to FIG. 4, a second on-off button 13 may be conveniently located at the end of the probe 2. The wire 14 that connects the probe 2 to the housing 1 in this embodiment may be retractable, and may be retracted by use of a retract button 15. A spring-loaded clip 16 may be attached to the housing 1 to allow the housing portion of the thermometer 1 to be releasably attached to a person or object.

Figure 6:
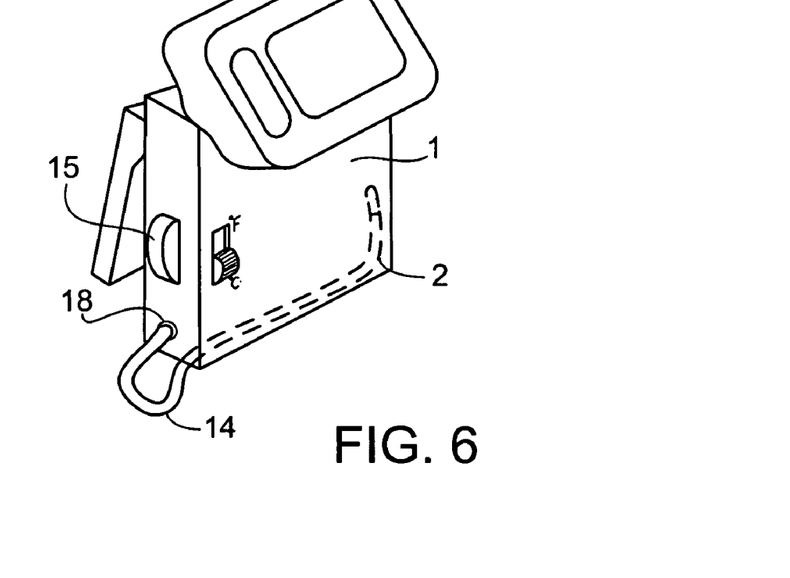
FIG. 6 is a side view of the oral thermometer in FIG. 4 with a view of the cords of the thermometer retracted into the housing for storage and the probe positioned in the storage area.

Turning now to FIG. 6, the probe 2 may be stored inside the housing when the cord 3 is retracted through an opening in the housing 18 and into the housing 1 to protect the probe 2 from damage or contamination.

Figure 7:
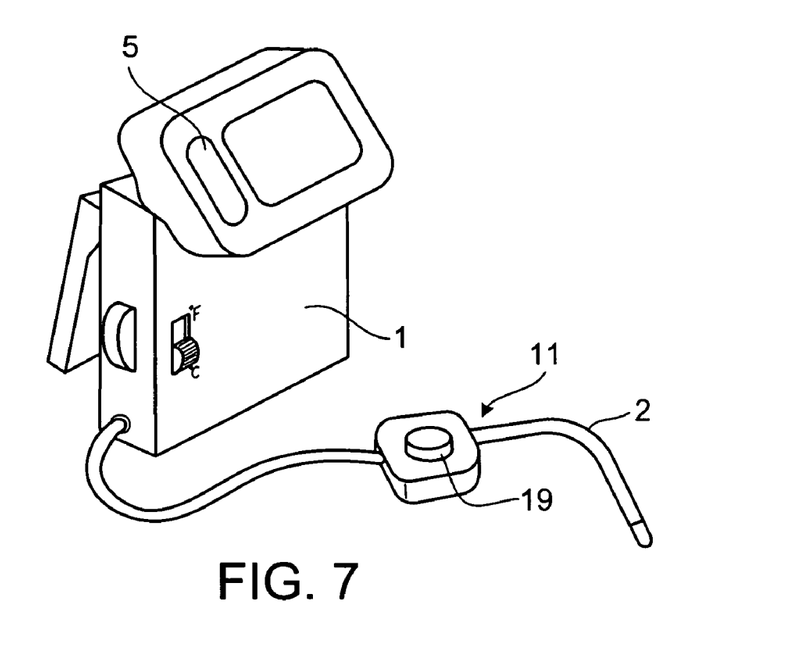
FIG. 7 is perspective view of an alternative embodiment showing an oral thermometer shown with dual button for on and off modes.

FIG. 7 demonstrates dual on off buttons 5 and 19 located on the housing 1 and on the non-sensing end 11 of the probe 2, respectively. FIG. 9 shows a side view of the probe 2 including the button 19.

Figure 8:
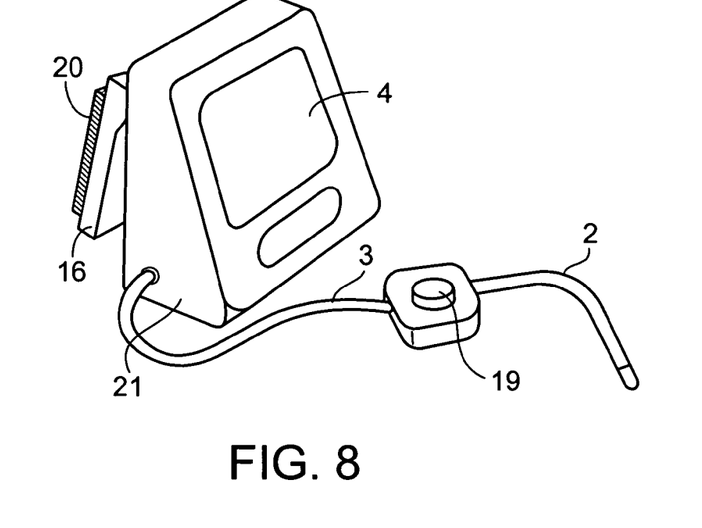
FIG. 8 is a perspective view of an alternative embodiment of the oral thermometer shown in FIG. 4 that can be attached to a person or object by means of a clipping mechanism and/or by a magnet attachment.

FIG. 8 shows another embodiment of the invention with a housing 21 having an angled front surface and a clip 16 having a magnetic attachment 20 to attach the unit to a metallic surface such as a metal cabinet.

Figure 10:
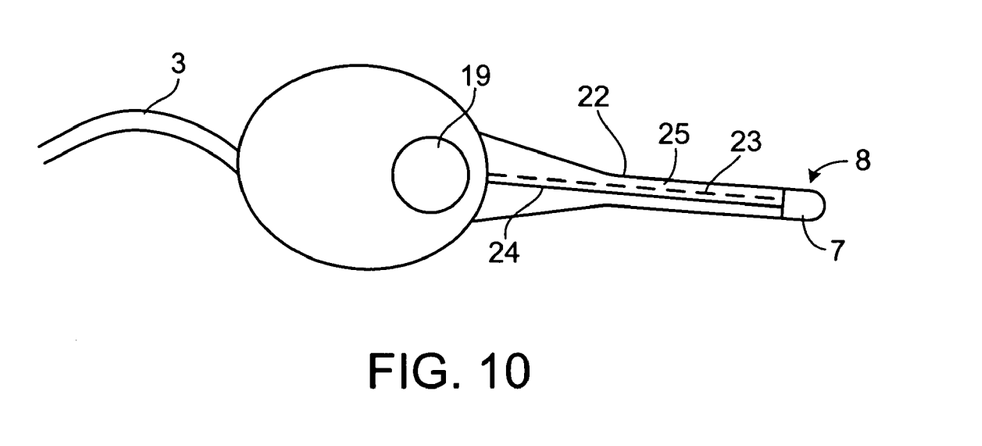
FIG. 10 is a top view of a thermometer probe that may be bent or curved to a desired configuration, shown in a straight position and a bent position.
Figure 11:
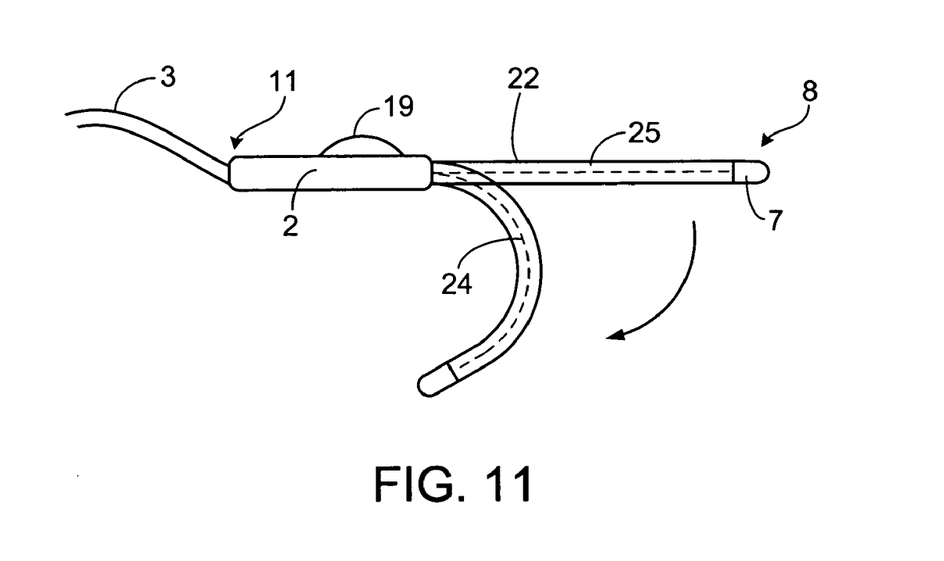
FIG. 11 is a side view of the probe shown in FIG. 10.
Figure 12:
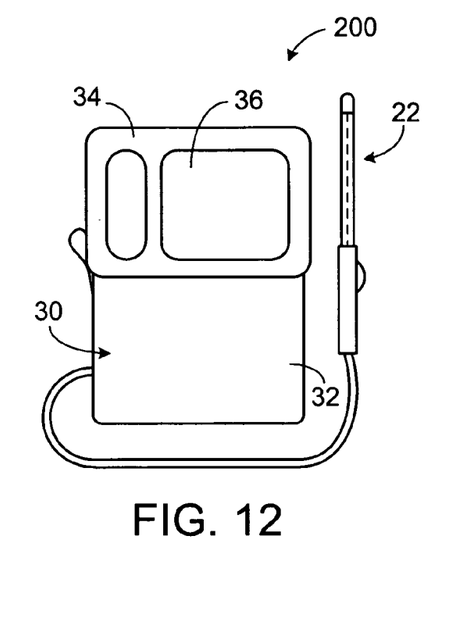
FIG. 12 is a front view of a digital thermometer that includes the probe shown in FIG. 10.
Figure 13:
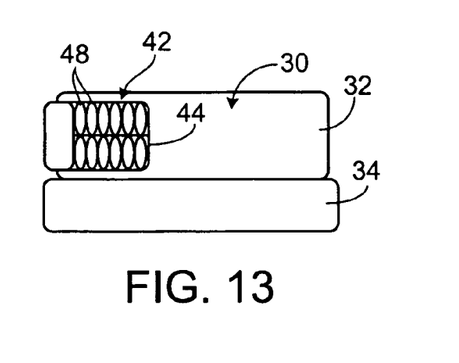
FIG. 13 is a top view of the digital thermometer shown in FIG. 12.

FIGS. 10–11 illustrate another thermometer embodiment in which the thermometer has a flexible probe 22 that may be shaped or posed to the desired non-linear shape. The thermometer may be manufactured with probe 22 in a linear configuration. Before use, probe 22 may be bent, shaped or configured into a desired non-linear configuration. As shown in FIG. 13, probe 22 may be bent so that it is substantially continuously curved along its length, which may be suited for a relatively large mouth, such as that of an adult. Alternatively, the probe 22 may be bent so that it defines a relatively smaller radius of curvature near its terminal end (not shown), a shape that may be more suited to a smaller mouth, such as that of a child. Thus, probe 22 may be positioned or posed in a variety of ways, to conform to the shape of a patient's mouth and thereby improve the comfort of the patient and the ease with which the patient's temperature may be taken.

Such a poseable probe 22 may be formed in any of a variety of ways. For example, probe 22 may have an internal stiffener such as a malleable metal core 24 with a softer plastic overmold 25. The malleable metal core 24 may, for example, be a solid copper wire of sufficient gauge, such as #12 gauge, to retain the posed shape of the probe after being bent to the desired configuration. Such a copper wire core can also act as one of the electrical conductors between the electronic circuitry of the thermometer and the thermistor disposed in the temperature sensing tip 7. However, in the embodiment shown in FIGS. 10–11, the probe includes a separate wire 23.

In another example, a poseable probe may be formed from a plurality of interconnected, relatively stiff pivoting joints (not shown) disposed inside the soft plastic overmold. In a further example, a poseable probe could also be formed without an internal stiffener, such as from a polymer having good ductility and also having low elasticity, such that it can be shaped into the desired configuration and retain the shaped configuration. This bendable polymer may form an internal core of the probe with a softer polymer overmold, or the entire probe may be formed from this bendable polymer.

Like the thermometers described above, the thermometer shown in FIGS. 10–11 contains electronic circuitry to receive a temperature signal from a temperature sensor located in the temperature sensing tip of the probe, to translate the temperature signal into a temperature measured by the temperature sensor and to provide the translated value of the temperature to the display for displaying the measured temperature.

FIGS. 12–14A show a digital thermometer 200 that includes the poseable probe 22. The features of the thermometer 200 may be used with other types of probes, e.g., the probe 2 shown in FIG. 1. Thermometer 200 includes a housing 30 having a base portion 32 and a display portion 34 with a display screen 36 for displaying the patient's temperature. Display portion 34 may be pivotable, as discussed above.

Figure 14:
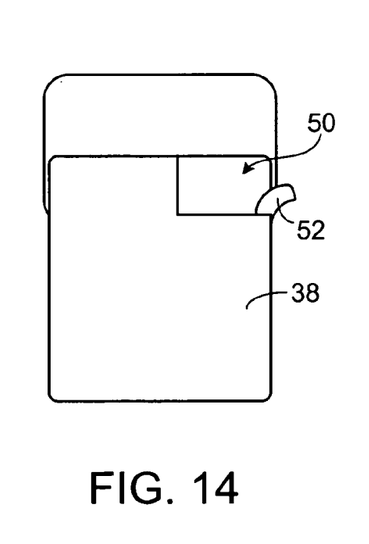
FIG. 14 is a rear view of the digital thermometer shown in FIG. 12.
Figure 14A:
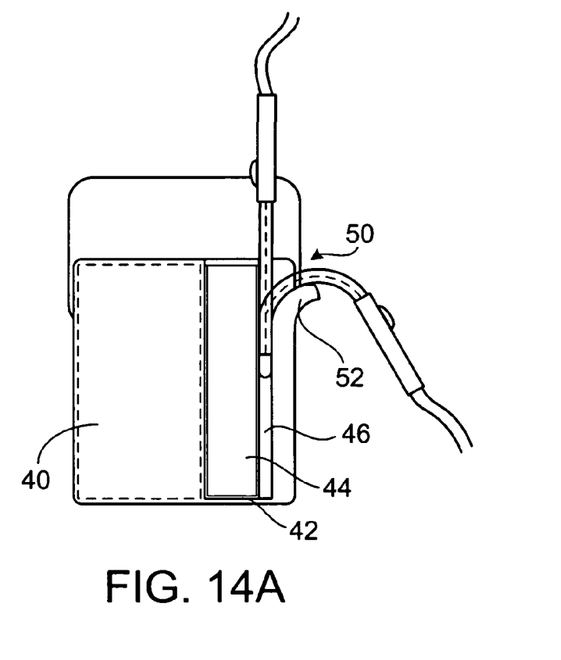
FIG. 14A is similar to FIG. 14, except that a portion of the rear panel of the housing is removed to diagrammatically show the interior of the housing.

The housing 30 includes a removable back plate 38 (FIG. 14), which, when removed, exposes a first chamber 40 which houses the electronics and batteries of the thermometer, a second chamber 42, which houses a removable and replaceable probe cover cartridge 44, and a probe-receiving slot 46 (FIG. 14A).

As shown in FIG. 13, second chamber 42, and the probe cover cartridge 44 within the second chamber, are open at the top. Thus, the probe covers 48 contained in the probe cover cartridge are exposed so that the probe 22 can be inserted into a probe cover and withdrawn, carrying the probe cover, without the user's fingers contacting the probe cover. The probe covers may include a relatively stiff rim, provided in an open position as shown in FIG. 13, to facilitate insertion of the probe tip into the probe cover.

The probe-receiving slot 46 is also open at its top end 50. Slot 46 includes a curved shoulder portion 52 adjacent top end 50, configured so that when probe 22 is partially inserted into slot 46 (FIG. 14A) the probe can be bent over the shoulder portion 52 into a curved shape. Thus, the poseable probe 22 can be moved from its linear shape to its non-linear, curved shape without the user contacting the probe with the user's fingers.

Thus, because the housing 30 includes the probe cover cartridge 44 and the probe-receiving slot 46, the temperature-taking procedure can be accomplished without contamination of the probe or the user's fingers. Moreover, probe-receiving slot 46 allows the probe 22 to be safely stored within the housing without contamination or damage.

Other embodiments are within the claims. For example, while the poseable thermometer probe shown in FIGS. 10–11 includes button 19, other styles of probes, for example the buttonless probe shown in FIG. 1, can also be made poseable. Similarly, the other features described above may be combined in any desired combination.

What is claimed is:

1. A digital thermometer for measuring the temperature of a living being by inserting a portion of the thermometer in the mouth of the living being comprising:
   a probe with first and second ends and an intermediate portion of the probe disposed between the first and second ends, the intermediate portion having a non-linear shape and being moveable between the non-linear shape and a substantially linear shape,
   a temperature sensor disposed near the first end of the probe,
   a housing, separate from the probe and having a display for displaying a temperature measured by said thermometer, said housing having a portion configured to allow a user to move the probe between its linear and non-linear shapes without the user contacting the probe with his or her fingers, and
   electronic circuitry, within said housing, in communication with said temperature sensor to receive a temperature signal from said temperature sensor, to translate said temperature signal into a value representative of the temperature measured by the temperature sensor, and to communicate the translated value to the display for displaying the measured temperature.

2. The thermometer of claim 1 wherein the non-linear shape comprises a curve of constant radius.

3. The thermometer of claim 1 wherein the probe includes a material selected to enable the intermediate portion to remain in a shape to which it is moved until it is moved to another shape.

4. The thermometer of claim 3 wherein the material comprises a stiffening core.

5. The thermometer of claim 4 wherein the core comprises a wire.

6. The thermometer of claim 4 wherein the core comprises a segmented stiffening member.

7. The thermometer of claim 3 wherein the material comprises a bendable polymer.

8. The thermometer of claim 1 wherein the housing includes a chamber configured to store a plurality of probe covers.

9. The thermometer of claim 8 wherein the chamber includes an opening configured to receive the probe so that the probe may be inserted into one of the probe covers in the chamber, and the probe and probe cover pulled from the chamber.

10. The thermometer of claim 1 wherein said portion comprises a slot into which the probe can be partially inserted.

11. The thermometer of claim 1 wherein the probe includes a relatively hard core and a relatively softer polymeric sheath, the sheath enclosing the core and being exposed for contact with the living being's mouth.

12. The thermometer of claim 1 wherein the display is pivotably mounted on a portion of the housing.

13. The thermometer of claim 1 further comprising a control button mounted in the vicinity of the probe.

14. The thermometer of claim 1 wherein the probe is connected to the housing by a cord.

15. The thermometer of claim 14 wherein the housing is configured to allow the cord to retract into the housing when the thermometer is not in use.

16. The thermometer of claim 15 further comprising an actuator configured to allow the user to control the retraction of the cord.

17. The thermometer of claim 15 wherein the housing includes a chamber configured to store the probe.

18. The thermometer of claim 8 wherein the chamber is configured to receive a replaceable probe cover cartridge.

19. The digital thermometer of claim 1 wherein said probe includes an exterior portion formed from a relatively soft material and an internal stiffening element formed from a relatively harder material.

20. The digital thermometer of claim 19 wherein said internal stiffening element comprises a malleable metal.

21. The digital thermometer of claim 1 wherein said probe is formed from a ductile polymer with low elasticity that permits shaping of the intermediate portion of the probe into a desired non-linear shape.

22. The digital thermometer of claim 1 wherein said intermediate portion of said probe is linear prior to being shaped into said non-linear shape.

23. The digital thermometer of claim 1 wherein said intermediate portion of the probe is shaped to rest on the lower lip and/or teeth of the living being.

* * * * *